United States Patent [19]

Rod et al.

[11] 4,217,402
[45] Aug. 12, 1980

[54] PHOTOELECTROCHEMICAL CELLS HAVING GELLED ELECTROLYTE

[75] Inventors: Robert L. Rod, Marina del Rey; Walter J. Penick, Culver City; Rodney J. Dobson, Redondo Beach, all of Calif.

[73] Assignee: Monosolar Inc., Santa Monica, Calif.

[21] Appl. No.: 9,257

[22] Filed: Feb. 5, 1979

[51] Int. Cl.² .................. H01M 6/30; H01M 6/36
[52] U.S. Cl. ................................................ 429/111
[58] Field of Search ........................................ 429/111

[56] References Cited

U.S. PATENT DOCUMENTS

| | | | |
|---|---|---|---|
| 4,064,326 | 12/1977 | Manassen et al. | 429/111 |
| 4,084,043 | 4/1978 | Witzke et al. | 429/111 |
| 4,152,490 | 5/1979 | Witzke | 429/111 |

OTHER PUBLICATIONS

K. Nakatani et al., "Photoanodic Behavior of n-type CdS in Acetonitrile Solutions Containing Iodide Ions", *J. Electrochem. Soc.*, vol. 125, pp. 406–409 (1978).
H. Gerischer, "Semiconductor Electrodes for Conversion & Storage of Solar Energy", *Electrochemical Society Proceedings*, vol. 77—6, pp. 8–29 (1977).
A. J. Nozik, "Energetics of Photoelectrolysis", *Electrochemical Society Proceedings*, vol. 77—3, pp. 272–289 (1977).

*Primary Examiner*—Aaron Weisstuch
*Attorney, Agent, or Firm*—Edwin A. Oser

[57] ABSTRACT

Schottky and p-n type photo-electrochemical cells are disclosed. These cells are suitable for sunlight and use gelled electrolytes based either on aqueous or solvent substances. The gel is a light-transparent, inert substance. These cells have at least one electrode of a semiconductor. The second electrode may be a metal or a semiconductor of the opposite conductivity type. These gelled electrolyte cells display performance advantages over their corresponding liquid electrolyte cell structures. Higher photovoltages and photocurrents are obtained along with a reduction in the rate of undesired photo-decomposition of one of the electrodes. Furthermore, gelled electrolytes may be contained between two closely spaced electrodes. This type of cell reduces both ohmic losses and light attenuation.

7 Claims, 12 Drawing Figures

PHOTOELECTROCHEMICAL CELLS HAVING GELLED ELECTROLYTE

BACKGROUND OF THE INVENTION

This invention relates generally to photoelectrochemical cells and particularly to such cells having a gelled electrolyte.

Considerable work has been done in the recent past on photoelectrochemical cells. One basic type of cell has one electrode which is a photo-active semiconductor while the other consists of metal. This has been referred to as a Schottky type cell because it resembles the all solid state equivalent of the same name. In the second type both electrodes are photo-active semiconductors, the anode consisting of an n-type and the cathode of a p-type semiconductor or vice versa.

Between the electrodes a suitable electrolyte is provided. This may either be an aqueous solution or a solvent or a combination of the two. This electrolyte usually includes a competitive redox-active system whose function is to eliminate either anodic oxidation or cathodic reduction. These photoreactions tend to decompose one of the electrodes. If this decomposition is allowed to occur it will quickly reduce the cell to uselessness.

Numerous workers have reported work on such cells which may make use of single or polycrystalline semiconductors. The semiconductors themselves have involved a wide range of narrow bandgap and wide bandgap materials, the bandgap being defined as the gap between the valence or filled band and the conduction band. Major emphasis has been on narrow bandgap materials because they can best capture wavelengths within ordinary sunlight and are capable of efficiently transforming solar energy into electricity.

The technology involving such cells with liquid electrolytes has been covered in U.S. Patent to Manassen et al., U.S. Pat. No. 4,064,326. This patent in particular describes a cell utilizing cadmium sulfide, cadmium selenide, cadmium telluride and other semiconductor materials. The patent also discloses various redox couples suitable for the prevention of photoelectrode corrosion or decomposition.

Cells which use solvents as electrolytes in lieu of the conventional aqueous electrolytes are reported upon in a paper by Nakatani, Matsudaira and Tsubomura which appears in the *Journal of the Electrochemical Society: Electrochemical Science and Technology*, Volume 125, No. 3, pages 406 to 409, March 1978. For any selected system of semiconductors and electrolytes a particular redox system must be selected. Such a redox system or couple introduced to the electrolyte ensures that a competitive redox reaction takes place at lower energy levels than those required for the decomposition of one of the electrodes. It should also be realized that the electrolyte itself is subject to decomposition.

Reference is also made to a paper by H. Gerischer which appears in the *Journal Proceedings of the Electrochemical Society of a Symposium on Electrode Materials and Processes for Energy Conversion and Storage*, Volume 77-6, pages 8-29 (1977). This paper discloses at length photoelectrochemical cells utilizing aqueous electrolytes, energy reactions within the cell, as well as redox couples. In this connection reference is made, for example, to FIG. 4 of the paper relating to redox reactions. FIG. 7 shows energy correlations between band edges of various semiconductors and some redox systems in aqueous electrolytes.

The subject has been treated mathematically in a paper by A. J. Nozik, entitled "Energetics of Photoelectrolysis" which appears in *Proceedings of the Electrochemical Society of a Conference on the Electrochemistry and Physics of Semiconductor Liquid-Junction Solar Cells*, Volume 77-3, pages 272 to 289 (1977).

SUMMARY OF THE INVENTION

In accordance with the present invention the electrolyte for a photoelectrochemical cell is in the form of a gel. The gel may either be based on an aqueous electrolyte or a solvent electrolyte. Some gels have the property of becoming liquified upon mechanical vibration and revert to the gel state when the vibration ceases. They are sometimes called thixotropes. A gelled electrolyte may, for example, be obtained by the addition of a typical gellant such as silicon dioxide ($SiO_2$).

In general, prior art photocells using liquid electrolytes display high values for photovoltage and current, as well as for the dark or reverse current. This is probably because of the very intimate contact between the selected semiconductor and the liquid electrolyte. In the case of the forward characteristic, that is the photovoltage and photocurrent, the intimate contact between the electrodes and the electrolyte is generally helpful. However, if there are excessive grain boundaries in the semiconductor such as intimate contact adversely increases the reverse or dark current which decreases, of course, the photoconversion efficiency.

Instead of using silicon dioxide as a gellant it is also feasible to use a gellant based on gelatine. The semiconductor electrode may consist of p-type or n-type semiconductors such as cadmium telluride (CdTe:In or CdTe:As). The second electrode may consist of a metal such as nickel or carbon or of a conductive semiconductor such as tin doped indium oxide ($In_2O_3$:Sn) which is an n-type semiconductor. It is also feasible to use two electrodes each consisting of a semiconductor, the two semiconductors being of the opposite conductivity type.

By way of example the redox couple may consist of $I_2^{-2}/I_2$.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
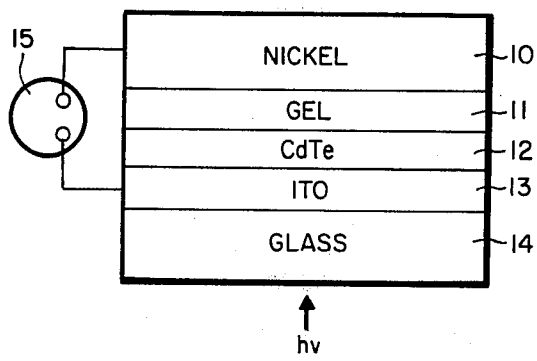
FIGS. 1-5 are schematic representations of various photoelectrochemical cells in accordance with the present invention having different electrode materials.

Referring now to the drawings and particularly to FIGS. 1-5, there are illustrated by way of example 5 different configurations of gelled electrolyte photoelectrochemical cells embodying the present invention.

As shown in FIG. 1, a conductive layer may be formed by a layer 13 of tin-doped indium oxide usually referred to as ITO ($In_2O_3$:Sn) deposited on a substrate 14 of glass. The ITO layer 13 is a conductive, n-type semiconductor. The first electrode 12 consists of cadmium telluride which may either be of the p-type or of the n-type and is electrolytically deposited on the ITO layer 13. The p-type is doped with arsenic and the n-type is doped with indium, both as disclosed and claimed in the prior application to Kroger and Rod, Ser. No. 899,227 filed Apr. 24, 1978 and assigned to the assignee of the present application. The second or counter electrode 10 may consist of nickel and a layer 11 of a gel is disposed between the electrodes 12 and 10. The light impinges through the glass substrate 14 and the ITO layer 13 onto the photo-active telluride layer 12 as shown by an arrow labeled hv. Both the ITO layer 13 and the gel layer 11 are transparent to light.

The photovoltage and photocurrent are measured by a multimeter 15 which may, for example, be connected between the nickel electrode 10 and the ITO layer 13. In a conventional manner the open circuit voltage ($V_{oc}$) is measured by the multimeter 15, as well as the short circuit current ($J_{sc}$).

Figure 2:
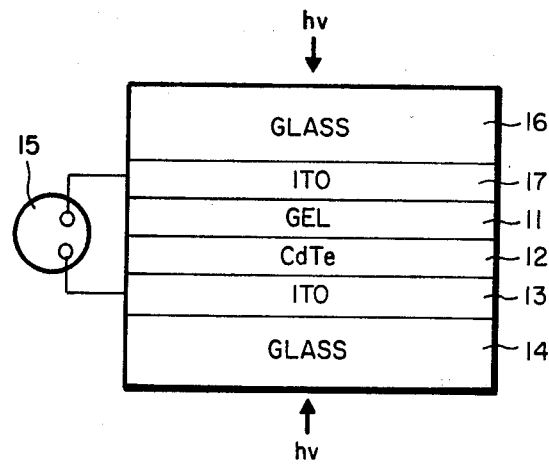

Another configuration is illustrated in FIG. 2. The structure has a glass substrate 16 followed by an ITO layer 17 which may form one electrode. The remainder of the cell is similar to that of FIG. 1 and includes the gel 11, a cadmium telluride layer 12, an ITO layer 13 and a glass substrate 14. The cadmium telluride layer 12 may again be of the n-type or p-type. The meter 15 is connected between the two ITO layers 17 and 13. The light as shown by the arrow labeled hv, may impinge on either side.

Figure 3:
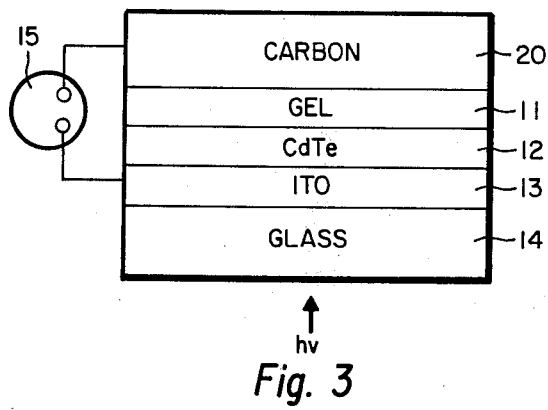

The cell of FIG. 3 is provided with a carbon electrode 20 instead of the nickel electrode 10 of FIG. 1 and followed again by a gel layer 11, a cadmium telluride layer 12, ITO layer 13 and glass substrate 14. The meter 15 is connected between the carbon electrode 20 and the ITO layer 13, the light impinging on the glass substrate 14 as shown.

Figure 4:
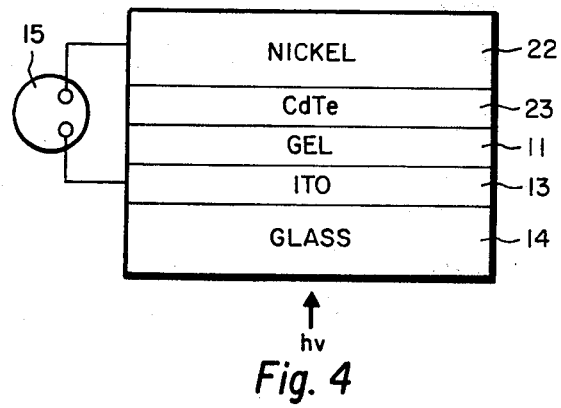

The cell of FIG. 4 is provided with a nickel electrode 22 followed by a cadmium telluride layer 23. The cadmium telluride layer 23 is followed by a gel layer 11 which in turn is followed by an ITO layer 13 and a glass substrate 14. The main difference between the cells of FIGS. 1 and 4 is that the cadmium telluride layer in FIG. 1 is between the ITO layer 13 and the gel 11 while in FIG. 4 it is between the nickel electrode 22 and the gel 11. The meter 15 is connected between the nickel electrode 22 and the ITO layer 13. In the cells of FIGS. 3 and 4 the semiconductor layer 12 or 23 may again be of the p-type or n-type.

Figure 5:
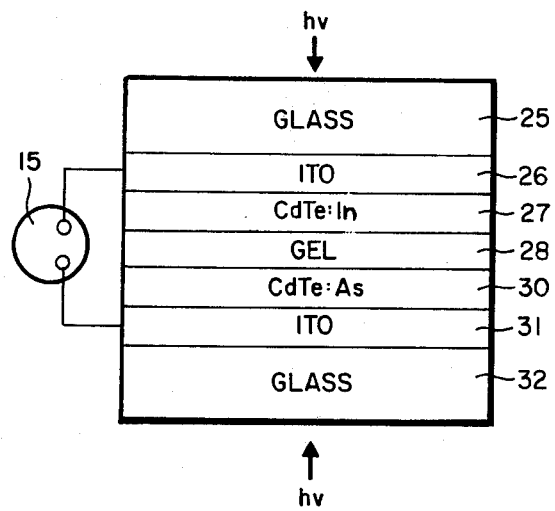

FIG. 5 illustrates another cell configuration which features two semiconductor electrodes of opposite conductivity type. Thus the cell of FIG. 5 has a glass substrate 25 followed by an ITO layer 26. A layer 27 consists of an n-type semiconductor such as indium doped cadmium telluride. This is followed by a gel 28 and by a p-type semiconductor such as arsenic doped cadmium telluride. This in turn is followed by an ITO layer 31 and a glass substrate 32. As shown the light may impinge on either one of the glass substrates 25 or 32. The meter 15 is connected by the two ITO layers 26 and 31.

EXAMPLE 1

The cadmium telluride may be codeposited with either indium or arsenic to obtain either n-type or p-type semiconductors respectively. The co-deposition takes place on either ITO or nickel substrates as shown in FIGS. 1-5. The deposition voltage $V_{dep} = -0.645$ V is measured with the standard calomel electrode and the deposition current $I_{dep} = 0.075$ mA/cm$^2$. The deposition takes place at a temperature of 90° C. for 60 minutes. The electrolyte is 1.0 N cadmium sulfate (CdSO$_4$) at a pH of 2.4. The source of tellurium may, for example, consist of an anode or auxiliary anode of a bar of tellurium metal. This is particularly useful for the deposition of an n-type cadmium telluride. Concerning the deposition of either p- or n-type cadmium telluride, reference is made to the Kroger et al. copending application above referred to.

To 125 mls of the electrolyte was added 0.2 gram of tellurium oxide (TeO$_2$) and potassium hydroxide (KOH). The potassium hydroxide was in the form of pure salt and was added to the solution to adjust the pH to 11. The tellurium oxide was completely dissolved by stirring. While stirring CAB-O-SIL of very pure grade (M-5) was added to the gel solution. CAB-O-SIL is a commercially available gellant of SiO$_2$. The added gellant ranges from 10% to 65% by weight of the potassium hydroxide (KOH). This produces a thixotropic gel. The gel begins to form at an addition of CAB-O-SIL of approximately 10% by weight of the KOH. Additional CAB-O-SIL may be added up to 65% by weight to obtain a very firm gel. No redox couple is used in this example.

When CAB-O-SIL is added to the electrolyte, surface hydroxyl groups may link individual aggregates together through hydrogen bonding. This is due to covalently-bonded hydroxyl and siloxane groups. Thus a thickening thixotrope gel is formed. This network formation is reversible. Some of the relatively weak hydrogen bonds are disrupted by shearing action. Hence by applying a shearing force the gel is liquified and reverts back to a gel after shearing ceases. This, of course, is a thixotropic gellant.

Measurements of such a cell may be made with a calibrated light source which is a solar simulator. Such a simulator is obtainable in the trade from A. G. Heinze available under the denomination of JKH Fiber Optic Illuminator. This illuminator resembles an AM2 light source which corresponds to sunlight falling at ground level on the earth in the absence of clouds.

Figure 7:
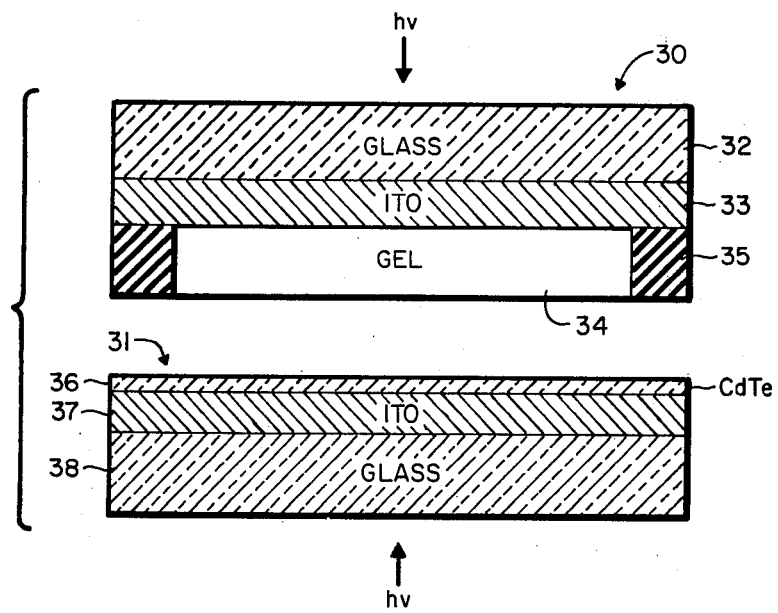
FIGS. 7 and 8 are exploded elevational views of two different cells illustrating how they may be combined to form a substantially solid structure.

Reference is now made to FIG. 7 which shows by way of example a gelled photoelectrochemical cell as shown in FIG. 2 based on an alkaline aqueous electrolyte as outlined in Example 1. As shown in FIG. 7, the cell consists of two portions 30 and 31. The portion 30 consists of a glass substrate 32 and ITO layer 33 and a gel 34 which is a gelled alkaline aqueous electrolyte as just described. The gel is surrounded by an annular rubber retainer 35. The other structure 31 consists of a layer of cadmium telluride 36 deposited as just described on an ITO layer 37 which in turn is on a glass substrate 38. The two cell portions 30 and 31 are then pressed together to form a desired cell.

The values $V_{oc} = 500$ mV and $J_{sc} = 4$ mA/cm$^2$ were measured for the cell of FIG. 7 constructed as previously explained. The cadmium telluride polycrystalline semiconductor film was 0.2 microns thick having grains measuring 0.2 microns. The ITO layer was about 5,800 A thick and transmits 90% of visible light. The sheet resistance of the ITO was about 7 ohms per square. It should be noted that in FIG. 7 the cadmium telluride was doped with indium and hence was of the n-type.

Figure 8:
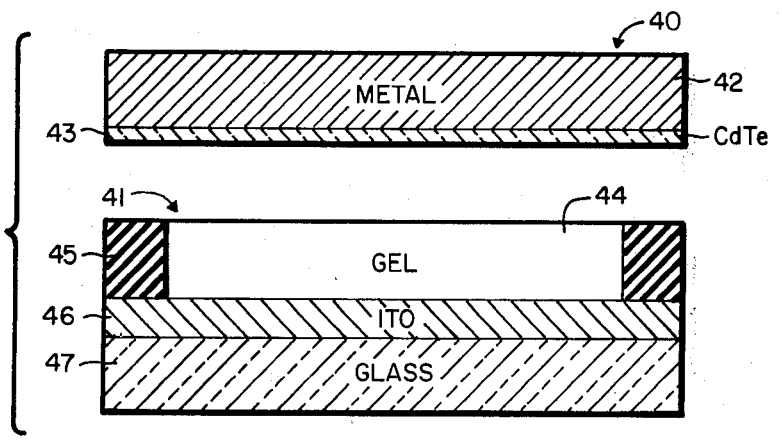

FIG. 8 to which reference is now made, shows another cell configuration consisting again of two parts 40 and 41. Part 40 consists of a metal layer 42 which may, for example, be nickel or carbon followed by an n-type cadmium telluride layer 43. The gel shown at 44 is the same gel 34 of FIG. 7 and is retained by a ring 45 of rubber. It is followed by an ITO layer 46 on a glass substrate 47.

For a nickel electrode a $V_{oc}$ of 515 mV was found and $J_{sc}$ was 4 mA/cm². On the other hand, for a carbon electrode the $V_{oc}$ was 720 mV and the $J_{sc}$ 3 mA/cm².

Instead of utilizing an alkaline aqueous electrolyte which is gelled such as described in Example 1, it is also feasible to utilize a gelled solvent material which may, for example, be based on a liquid acetonitrile solution ($CH_3CN$) which is also called methyl cyanide.

EXAMPLE 2

The indium doped cadmium telluride is again deposited as described in Example 1.

100 mls of spectrophotometric grade acetonitrile was added to 2 mg of iodine ($I_2$) corresponding to $6 \times 10^{-4}$ M $I_2$. Furthermore, 53 mg of lithium perchlorate ($LiClO_4$) corresponding to 0.1 M was added. The lithium perchlorate is a supporting electrolyte. In addition 0.427 gm sodium iodide (NaI) which corresponds to 0.285 M was added. The sodium iodide, lithium perchlorate and acetonitrile may be purged with nitrogen gas.

10 mls of this solution was combined again with CAB-O-SIL to make a gel. Again an n-type cadmium telluride layer was used for the measurements. All measurements were done in a hood. The light source, as previously described, was 2 inches from the photoelectrochemical cell. As will be explained hereinafter a redox couple was present.

Figure 6:
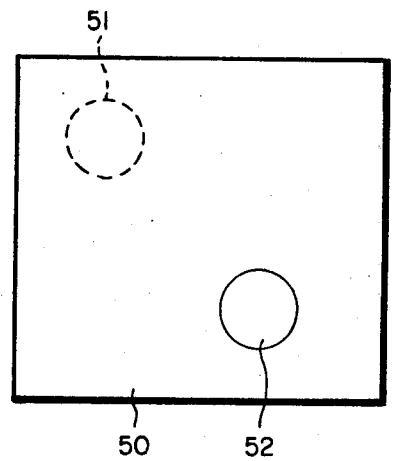
FIG. 6 is a plan view of a layer of semiconductor to be used for comparative tests of various cells based on either liquid or gelled electrolytes.

Referring now to FIG. 6, there is illustrated a plan view of a layer 50 of semiconductor material such as cadmium telluride. A first measurement of photovoltage and photo current is made with the light source focused at 51 on the semiconductor layer 50. Subsequently, a photoresist is used to cover the entire surface of the layer 50 with the exception of the area 52 which is now used to measure the photovoltage and photocurrent of the same cell with a liquid electrolyte. This was done for comparison purposes, that is to compare both photovoltage and photocurrent for a gelled cell and a liquid electrolyte cell. The gelled cell was made as explained in Example 2 using indium-doped cadmium telluride.

Figure 9:
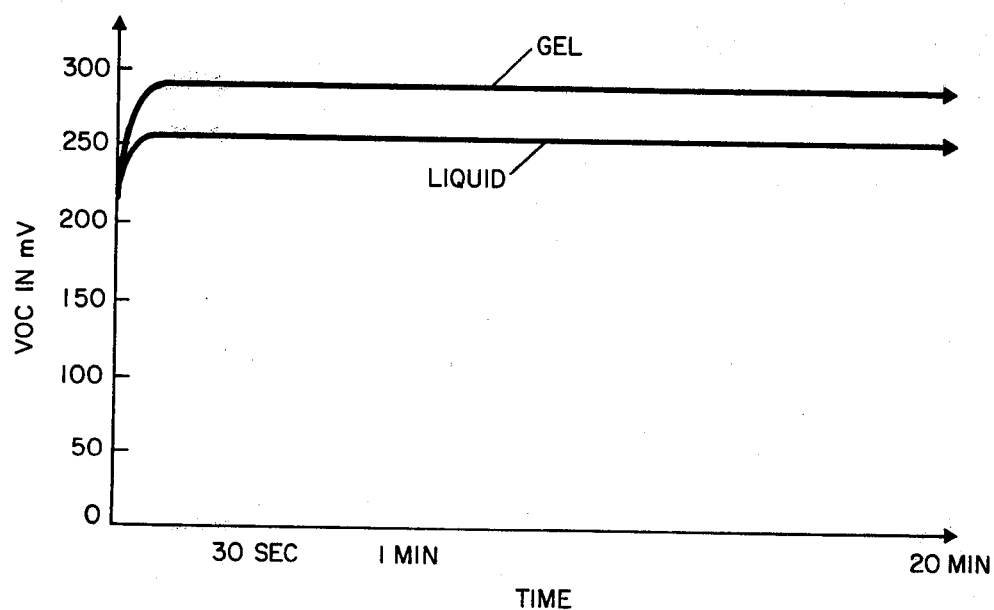
FIGS. 9 and 10 show graphs comparing respectively the open circuit voltage and the short circuit current for liquid and gelled solvent based electrolyte cells of a different type.
Figure 10:
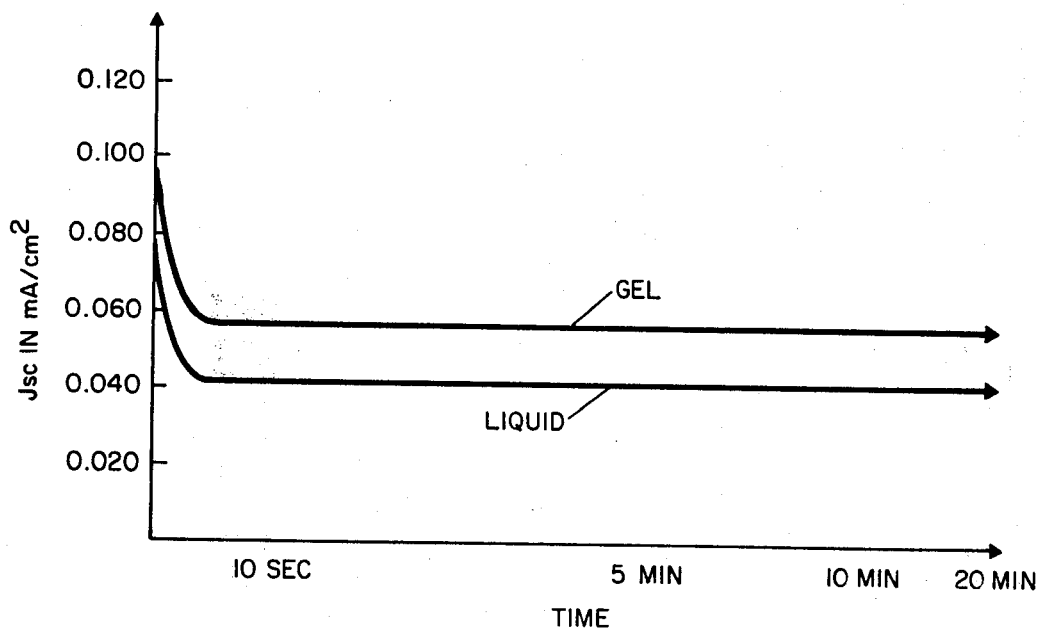

For the measurements just described the results are plotted in FIGS. 9 and 10. FIG. 9 illustrates the $V_{oc}$ in mV as a function of time. It will be noted that for both liquid and gel the curves are substantially linear after the initial few seconds. However, the voltage for the gelled cell is substantially higher than that for the liquid cell.

FIG. 10 illustrates similarly the $J_{sc}$ in mA/cm² for the same gelled cell and liquid cell. The current for the gelled cell drops in the first few seconds and then remains stationary at a substantially higher value than that of the liquid cell. In order to show more clearly the initial-circuit current drop, the initial time scale has been exaggerated.

It will thus be seen from the charts of FIGS. 9 and 10 that gelled photoelectrochemical cells have the unexpected advantage that their current is about 50% higher while the voltage is also increased compared to corresponding liquid electrolyte cells. Thus the voltage increases say from about 4% to about 8%.

Figure 11:
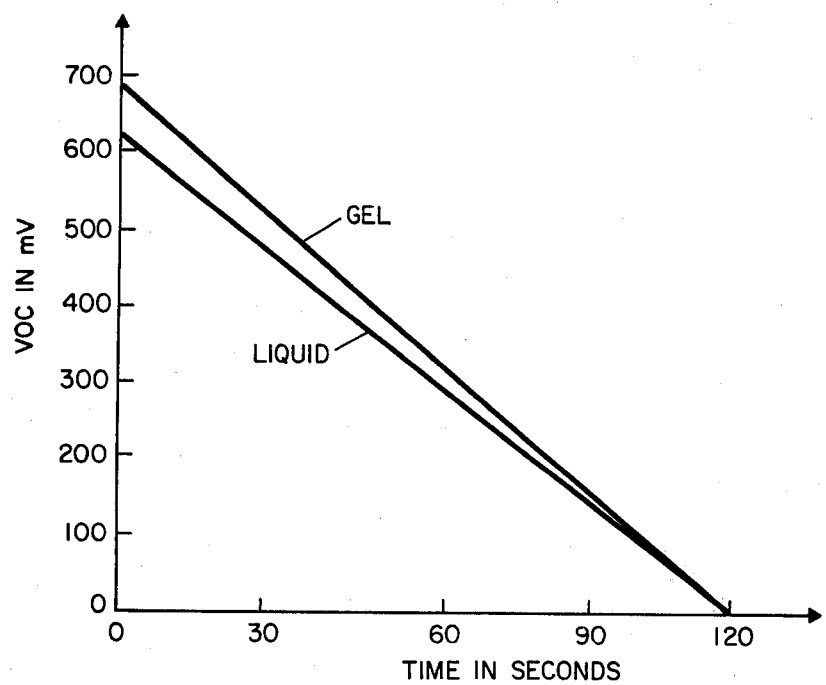
FIGS. 11 and 12 are charts comparing again the performance of liquid and gelled aqueous electrolyte cells.
Figure 12:
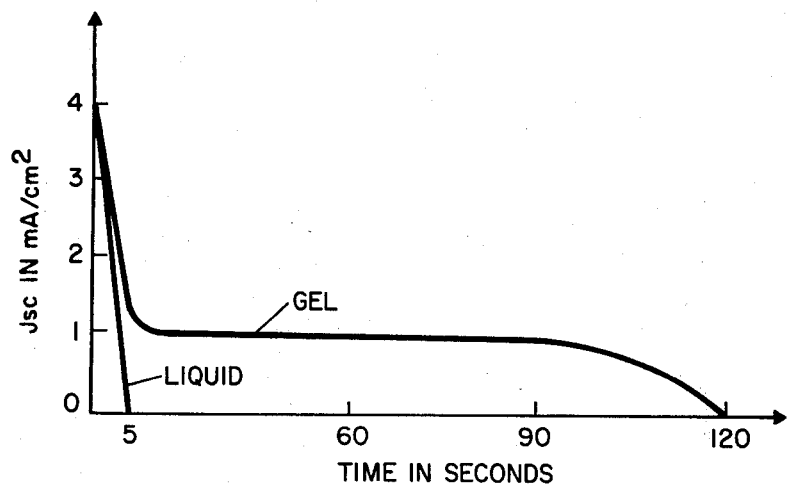

A similar comparison was made with the gelled and liquid cells based on an alkaline aqueous electrolyte according to Example 1 and using indium doped cadmium telluride. The results are plotted in FIGS. 11 and 12. FIG. 11 illustrates the $V_{oc}$ voltage in mV as a function of time for both gel and liquid. Again the gel cell has a higher initial voltage than the liquid cell. However, after 2 minutes the voltage of both cells reduces to zero. The reason for this rapid decrease of the voltage is the fact that the redox couple was intentionally omitted. In other words, the electrolyte consisted only of 1.0 N cadmium sulfate together with a small portion of potassium hydroxide and telluride oxide. Similarly, as shown in FIG. 12, the $J_{sc}$ of the liquid becomes 0 after five seconds while that of the gel cell extends for two minutes. It should be noted that in Example 2 the redox couple is iodine-iodide, that is $I_2/I_2^{--}$. It will also be understood that other redox couples will readily occur to those skilled in the art in view of the above referenced prior papers and patent.

EXAMPLE 3

Instead of using n-type semiconductors it is also possible to use a p-type semiconductor. Thus experiments have been made with arsenic doped cadmium telluride. For example, a configuration as shown in FIG. 3 was used. In this case the $V_{oc}$ was 730 mV and the $J_{sc}$ was 2 mA/cm². The gelled electrolyte was potassium hydroxide and CAB-O-SIL without a redox couple.

The configuration of FIG. 4 was similarly measured with p-type cadmium telluride (CdTe:As) and the same gel. In this case the $V_{oc}$ was 589 mV and the $J_{sc}$ was 1/mA/cm².

Finally a configuration as shown in FIG. 2 with the gel layer 11 and the cadmium telluride layer 12 exchanged was used. In this case measurements showed that $V_{oc}$ was 510 mV and $J_{sc}$ was 1 mA/cm².

EXAMPLE 4

Instead of using a gellant consisting of silicon dioxide it is also feasible to use a gellant based on gelatine. To this end it has been found that the unflavored gelatine as available in the trade from Knox will also produce suitable gelled cells. Thus experiments were made utilizing Knox gelatine to gel water and potassium hydroxide at a pH of 11. P-type cadmium telluride was used for the experiment, as well as n-type cadmium telluride. The configuration was that of FIG. 3 with p-type semiconductor. The $V_{oc}$ was measured to be 580 mV and the $J_{sc}$ was 1 mA/cm².

The same configuration was used again with n-type cadmium telluride. In this case measurements showed that the $V_{oc}$ was 620 mV and the $J_{sc}$ was 0.75 mA/cm².

However, it was found that the Knox gel melts seconds after touching the cadmium telluride. Hence measurements of open circuit voltage and short circuit current over a period of time was unreliable. The reason is believed to be the fact that the Knox gelatine rapidly melts under the influence of heat.

The reason why the gelled electrolyte improves the performance of the cells is not fully understood at this time. For example, it may be that a thick gel prevents the decomposition products of the photodisintegration from moving away from the reaction site. Of course the gelled electrolyte makes good contact to the semiconductor electrode. However, it may be that it is too thick to penetrate deeply into grain boundaries of the polycrystalline semiconductor surface. It is possible that this fortunate circumstance increases the efficiency and operating life of the photoelectrochemical cells. This may be based on the fact that while the forward current is high the dark photocurrent is reduced or inhibited.

By definition a thixotropic gellant can be converted from a gel state to a liquid upon application of agitation, usually in shear. When the agitation ceases, the liquid then reverts back into a gel. This useful feature has been utilized in one form of our invention wherein a sandwich of $SiO_2$ in a KOH electrolyte was disposed between the surrounding semiconductor electrode and the opposite counter electrode, all in the form of sheets. When this has been done and the dimensions of the device are optimized, typically with a gel layer of about 1/16th inch with 20% $SiO_2$ by weight of the KOH, a flat surface of the cell, usually the glass substrate side, was placed on a vibrating surface such as the tank bottom of an ultrasonic cleaner vibrating typically at a frequency of 20 kHz.

To couple the energy from the vibrating diaphragm of the cleaner into the solar cell, a thin layer of silicone grease was used as the acoustic couplant between the two. Then when the vibrator was turned on, the gel liquifies and forms a more intimate match or contact with the neighboring sheets on either side. This produces a higher photocell voltage and photocell current than can be achieved without utilizing this unique property of a thixotrope. After the desired improvement has been observed, the vibratory energy is turned off, and the gel forms again where previously the electrolyte was a liquid in the agitation environment.

What is claimed is:

1. A photoelectrochemical cell comprising:
   (a). a first electrode of cadmium telluride;
   (b) a second electrode of electrically conductive material; and
   (c) a gel disposed between said electrodes, said gel comprising an alkaline aqueous electrolyte and silicon dioxide acting as a gelled electrolyte.

2. A cell as defined in claim 1 wherein each of said electrodes is a semiconductor, said semiconductors being of the opposite conductivity type.

3. A cell as defined in claim 1, wherein said second electrode is a wide bandgap semiconductor oxide layer transparent to light.

4. A cell as defined in claim 3, wherein said second electrode consists of tin doped indium oxide.

5. A photoelectrochemical cell comprising:
   (a) a first electrode of cadmium telluride;
   (b) a second electrode of electrically conductive material; and
   (c) a gel disposed between said electrodes, said gel comprising acetonitrile, iodine, lithium perchlorate, sodium iodide and silicon dioxide acting as a gellant.

6. A photoelectrochemical cell comprising:
   (a) a first electrode of cadmium telluride;
   (b) a second electrode of electrically conductive material; and
   (c) a gel disposed between said electrodes, said gel comprising water, potassium hydroxide and gelatine acting as a gellant.

7. The process of forming a photoelectrochemical cell, said process comprising the steps of:
   (a) providing a first and a second electrode, one of said electrodes being a photoactive semiconductor;
   (b) providing a thixotropic gel;
   (c) disposing said gel between the electrodes; vibrating the thus obtained gel to liquify the gel, thereby to optimize both the photocell voltage and current; and permitting the gel to reform.

* * * * *